Patented May 22, 1934

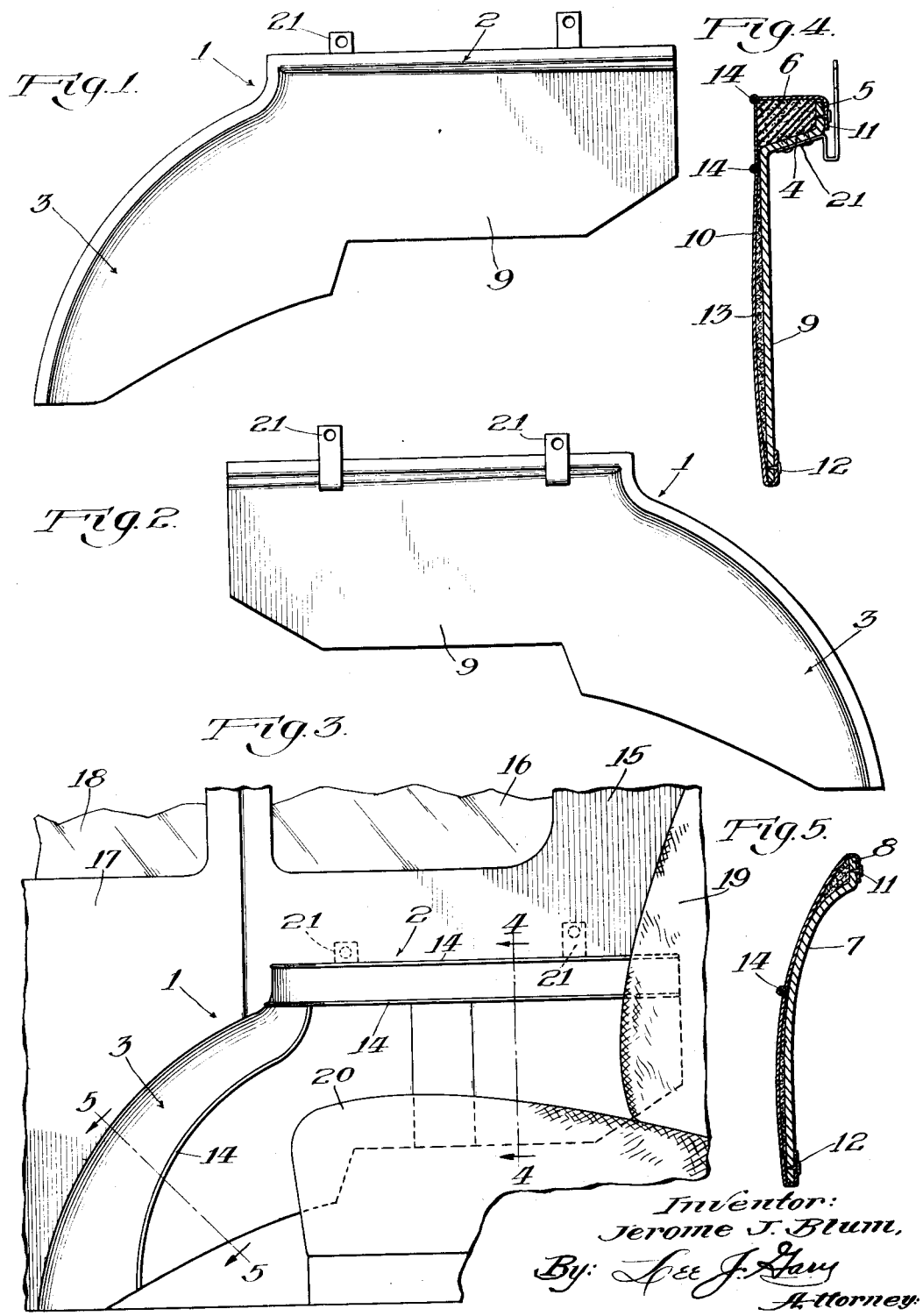

1,960,135

UNITED STATES PATENT OFFICE 1,960,135

SIDE ARM FOR AUTOMOBILES

Jerome J. Blum, Olean, N. Y., assignor to Arveyware Corporation, Olean, N. Y., a corporation of New York Application August 9, 1933, Serial No. 684,457

8 Claims. (Cl. 296—1)

This invention relates to improvements in felted or molded structures and refers specifically to a rigid one-piece structure used as an arm rest, rear quarter section and dog leg for an automobile, sedan or coach.

In some of the modern automobiles, particularly of the closed type having a rear seat, such as sedans and coaches of the two-door and four-door types, an arm rest has been provided for the comfort of the passengers adjacent each side of the rear seat. In addition, the present tendency in motor car design is toward a low slung body or one having a low center of gravity. The width of the rear portion of the usual motor car body, however, is greater than the tread of the rear wheels. Consequently, space must be provided at the rear sides of the body for the upper portions of the rear wheels.

Both of the above mentioned trends in automobile body design have necessitated the employment of more or less complicated additions to the skeleton framework of the automobile body and, consequently, these conveniences have been confined substantially exclusively to cars of the higher price field. This is primarily due to the labor cost since the time involved in assembling the additional structure is not economically feasible in the manufacture of inexpensive automobiles.

Heretofore, in the construction of the skeleton arm rest, rear quarter section and dog leg, by which latter term the curved covering of the rear wheel cavity is identified, appropriately shaped separate wooden members were used, said members being fastened to the frame proper of the body. The arm rest member comprised a more or less elaborately curved wood element, over which was nailed a plate of sheet metal, curved in conformity with the wooden element and extending laterally from said element to provide width to the arm rest. A sponge rubber cushion was subsequently glued to the metal plate and the assembly upholstered. The dog leg section comprised a wooden element which, of necessity, was curved in three dimensions. This element was also upholstered and mounted upon the frame proper as a separate operation. The rear quarter section comprised a separate piece of fibre board which had to be upholstered separately and attached to the frame below the arm rest as a separate operation.

As a feature of my invention, I provide a one piece base, hereinafter referred to as a side arm, which supplants the separate wood and metal members comprising the arm rest, the wood member comprising the dog leg and the fibre board comprising the lower rear quarter section. The side arm of my invention may be felted or molded at a fraction of the cost of the members heretofore used, and in addition, may be upholstered in a single operation and mounted as a unit upon the body frame. Consequently, many operations are saved both in the manufacture of the side arm and in the upholstering and mounting thereof in addition to a saving in the cost of materials. Side arms constructed according to my invention can, therefore, be furnished upon cars within the inexpensive field, adding little or no cost to purchaser and affording him the comfort and convenience heretofore only offered in more expensive automobiles.

Other objects and advantages of my invention will be apparent from the accompanying drawing and following detail description.

In the drawing, Fig. 1 is a front elevational view of the felted or molded side arm of my invention.

Fig. 2 is a rear elevational view of the structure shown in Fig. 1.

Fig. 3 is a fragmentary side elevational view of one side of the interior rear portion of a closed automobile.

Fig. 4 is a sectional view taken on line 4—4 of Fig. 3.

Fig. 5 is a sectional view taken on line 5—5 of Fig. 3.

Referring in detail to the drawing, 1 indicates a side arm comprising in a unitary structure an arm rest portion 2, a lower rear quarter section 9 and a dog leg section 3. Arm rest portion 2 is provided at the upper edge of side arm 1 and comprises a laterally offset ledge 4, shown best in Fig. 4, said ledge terminating in an upwardly extending flange 5. As will be hereinafter more fully described, ledge 4 and flange 5 are adapted to support and confine two sides of cushion 6 which may be constructed of sponge rubber or the like. The dog leg section 3 is of curved contour conforming substantially in arcuate form to a portion of the rear wheel cavity. In addition, dog leg 3 is bowed laterally as shown best at 7 in Fig. 5, defining a portion of the rear wheel cavity. A flange 8 may be formed at the upper edge of dog leg 3 and comprises an extension of flange 5. Immediately below arm rest 2 is the relatively flat rear quarter section 9 formed as an integral portion of structure 1. Adjacent dog leg 3, section 9 merges with the continuation of the bowed element 7.

In constructing side arm 1 as a felted fibrous structure, a foraminated form (not shown) conforming in shape to a face of said side arm, is immersed in a pulp solution and a condition of vacuum established. The aqueous carrier of the pulp is thus drawn through the foraminated surface of the form and a layer of intermeshed fibres deposited upon a face of the form. When a desired deposition of fibres has taken place, the form is removed from the pulp bath and the fibrous layer removed from the form. The layer may be dried prior to or subsequent to its removal from the form as desired, and after drying, the fibrous layer may be impregnated with any of the waterproofing or fireproofing impregnating agents familiar to those skilled in the art.

In constructing side arm 1 as a molded structure, a molding composition, which may comprise any moldable plastic, with or without the addition of fibre or other filler, such as synthetic or natural resins, phenol resins, plastic wood, bituminized fibres, etc., in suitable proportions, may be placed in a mold conforming in shape and contour to the shape and contour of the side arm desired to be produced, and by the use of heat or pressure or both, the composition may be molded into the shape and contour of the desired side arm. The molded side arm may be stripped from the mold and is ready for use.

Thus, by an inexpensive manufacturing operation the entire side arm 1 is constructed, as contrasted with the heretofore used time-consuming task of turning, milling and shaping wood members, stamping and bending a metal sheet and attaching the metal sheet to the wooden arm rest member.

After the side arm has been constructed, the cushion 6 may be adhesively or otherwise united to the arm rest portion 2 and the front face of the entire structure covered with upholstery 10, which is applied over section 9 and dog leg 3. The upholstery 10 may be tacked and adhesively united to the rear faces of the flanges 5 and 8, and the rear edge of the section 9, as shown best at 11 and 12 respectively in Figs. 4 and 5. Felt or other padding 13 may be inserted between section 9 and upholstery 10 and also between flange 8 and the upholstery covering the dog leg 3. The upholstery, if desired, may be set off or finished by adding trim 14.

Referring particularly to Fig. 3, 15 indicates the side wall of the body having a window 16 disposed therein. 17 indicates a rear door and 18 the window carried thereby. The rear portion of the car may be provided with the usual cushions 19 and 20. A fully upholstered side arm 1 may be mounted adjacent each end of cushions 19 and 20, the upper portion of the arm rest being adapted to serve as a support for the arm of a passenger.

Hangers or brackets 21 may be fastened as by rivets or the like 22 to the lower face of ledge 4 and to mount side arm 1 upon the body of the car, said brackets may be fastened to the skeleton frame portion which serves as a base for wall 15. As is usual, wall 15 and door 17 are covered with upholstery which matches the remainder of the upholstered equipment and consequently, the upholstery upon wall 15 covers brackets 21 from view. If desired, the lower edge of section 9 may be tacked to the frame of the wall.

It can readily be seen that, in addition to accomplishing a saving in the construction of the side arm itself, to upholster the same requires but one operation as does the mounting of the upholstered side arm upon the body proper. Consequently my invention is adaptable to the production methods in vogue in the manufacture of inexpensive motor cars and the buyer is obtaining a comfort and convenience heretofore only obtainable in automobiles of the higher price field, the cost of manufacture being so low as to entail no additional expense to the buyer.

In addition, the stresses due to pressure upon the arm rest are better resisted by my structure than in the arm rests heretofore devised, since said stresses are distributed throughout the entire arm. Heretofore said stresses were borne solely by the wooden member comprising the arm rest support and were in turn transferred to the screws which joined the arm rest block to the skeleton frame. This frequently resulted in disengagement or loosening of the screws and the consequent collapse of the arm rest.

By the expression "side arm" as used in the specification and claims is meant the base structure comprising the arm rest, lower rear quarter section and dog leg.

I claim as my invention:

1. A side arm for an automobile comprising a relatively rigid one-piece fibrous structure having an arm support and an arcuate-shaped forwardly and downwardly extending continuation of said support, the arcuate portion being bowed to define a portion of the cavity provided for the rear wheel of the automobile.

2. A side arm for an automobile comprising a relatively rigid, one-piece, felted, fibrous structure having a relatively flat arm support and an arcuate-shaped forwardly and downwardly extending continuation of said support, the arcuate portion being bowed to define a portion of the cavity provided for the rear wheel of the automobile.

3. A side arm for an automobile comprising a relatively rigid, one-piece, felted, fibrous structure having an arm support and an arcuate-shaped forwardly and downwardly extending continuation of said support, the arcuate portion being bowed to define a portion of the cavity provided for the rear wheel of the automobile, said arm support providing a ledge for the reception of a cushion.

4. A side arm for an automobile comprising a relatively rigid, one-piece, felted fibrous structure having an arm support, and an arcuate-shaped forwardly and downwardly extending continuation of said support, the arcuate portion being bowed to define a portion of the cavity provided for the rear wheel of the automobile, said arm support providing a ledge for the reception of a cushion, and said ledge having an upwardly extending flange.

5. A pre-formed one-piece side arm for an automobile comprising a main body portion consisting of a ledge, a downwardly extending projection of said ledge and a forwardly projecting continuation of said ledge and said downward extension, said forwardly projecting continuation being arcuate in shape and bowed to define a portion of the cavity provided for the upper portion of the rear wheel of the automobile.

6. A pre-formed integral side arm for an automobile comprising a main body portion consisting of a ledge, a downwardly extending projection of said ledge and a forwardly projecting continuation of said ledge and said downward extension, said forwardly projecting continuation being arcuate in shape and bowed to define a portion of the cavity provided for the upper portion of the rear wheel of the automobile, and a flange extending upwardly from the ledge and the arcuate portion.

7. A pre-formed integral side arm for an automobile comprising a main body portion consisting of a ledge, a downwardly extending projection of said ledge and a forwardly projecting continuation of said ledge and said downward extension, said forwardly projecting continuation being arcuate in shape and bowed to define a portion of the cavity provided for the upper portion of the rear wheel of the automobile, a flange extending upwardly from the ledge and the arcuate portion, a cushion mounted on said ledge confined by said flange, and a covering of upholstery completely covering one surface of said side arm and enclosing said cushion.

8. A side arm for an automobile comprising a relatively rigid, unitary, felted fibrous structure having an arm support, and an arcuate-shaped forwardly and downwardly extending continuation of said support, the arcuate portion being bowed to define a portion of the cavity provided for the rear wheel of the automobile, said arm support providing a ledge for the reception of a cushion, said ledge having an upwardly extending flange, a cushion mounted on said ledge and confined by said flange, and a covering of upholstery completely covering the exposed face of said side arm and enclosing said cushion.

JEROME J. BLUM.